US011929596B2

(12) United States Patent
McBride et al.

(10) Patent No.: US 11,929,596 B2
(45) Date of Patent: Mar. 12, 2024

(54) MODULAR SWITCHGEAR AND METHOD OF ASSEMBLING THE SAME

(71) Applicant: ABB Schweiz AG, Baden (CH)

(72) Inventors: Brittany Leigh McBride, Southbury, CT (US); Erik Ryan Khzouz, Plainville, CT (US); Michael Paul Lafond, Mebane, NC (US)

(73) Assignee: ABB Schweiz AG, Baden (CH)

( * ) Notice: Subject to any disclaimer, the term of this patent is extended or adjusted under 35 U.S.C. 154(b) by 29 days.

(21) Appl. No.: 17/710,259

(22) Filed: Mar. 31, 2022

(65) Prior Publication Data

US 2023/0318268 A1 Oct. 5, 2023

(51) Int. Cl.
*H02B 1/56* (2006.01)
*H02B 1/21* (2006.01)
*H02B 1/36* (2006.01)
*H02B 13/025* (2006.01)

(52) U.S. Cl.
CPC ............... *H02B 1/565* (2013.01); *H02B 1/21* (2013.01); *H02B 1/36* (2013.01); *H02B 13/025* (2013.01)

(58) Field of Classification Search
CPC . H02B 1/21; H02B 1/301; H02B 1/36; H02B 1/565; H02B 13/025
See application file for complete search history.

(56) References Cited

U.S. PATENT DOCUMENTS 5,577,613 A * 11/1996 Laidlaw .................. G06F 1/181 220/4.27
9,653,896 B2 5/2017 Lafond et al.
9,768,593 B2 * 9/2017 Rajauria ................ H02B 1/565
10,014,668 B2 * 7/2018 Rajauria .............. H02B 13/025
10,431,963 B2 * 10/2019 Rajauria .................. H02B 1/30
10,971,905 B2 * 4/2021 Rajauria .............. H02B 13/025
11,735,385 B2 * 8/2023 Hanna ...................... H02B 1/36 361/605
2015/0163957 A1 * 6/2015 Martinez-Cruz .. H05K 7/20009 454/184
2022/0209516 A1 * 6/2022 Williford ............... H02B 11/28

FOREIGN PATENT DOCUMENTS

EP 3002838 A1 * 4/2016 ............. H01H 9/342

* cited by examiner

*Primary Examiner* — Robert J Hoffberg
(74) *Attorney, Agent, or Firm* — Armstrong Teasdale LLP

(57) ABSTRACT

An electrical enclosure includes a main cabinet and a modular cabinet removably secured to the main cabinet. The main cabinet includes a bus compartment that includes a busbar assembly, and the bus compartment is located between an end wall of the main cabinet and a partition opposite the end wall. The modular cabinet is comprised of interlocking compartment modules. Each compartment module interlocks with an adjacent compartment module. Each compartment module includes first and second side panels. Each side panel includes an alignment member that engages an alignment member of a respective side panel of the adjacent compartment module. Each compartment module also includes a base that extends between the first and second side panels and a terminal wall that joins the first and second side panels. The terminal walls of the interlocking compartment modules engage to form a structural wall of the modular cabinet.

10 Claims, 11 Drawing Sheets

MODULAR SWITCHGEAR AND METHOD OF ASSEMBLING THE SAME

BACKGROUND

The field of the disclosure relates generally to electric switchgear and, more particularly, to switchgear having separate compartment modules and a method of connecting separate compartment modules to assemble switchgear.

Switchgear is an electrical enclosure or cabinet that houses electric switching and interrupting devices, such as circuit breakers, fuses, and associated control equipment, along with buses, power cables, and interconnections for the distribution of electric power. Switchgear is arranged into a series of sections that each house different components. For example, switchgear may include a cable section and a circuit breaker section. The cable section and the circuit breaker section may be located on opposite sides of a busbar assembly. The circuit breaker section may include compartments that house a circuit breaker in electrical connection with the busbar assembly and/or compartments that house auxiliary control equipment.

Typically, switchgear is assembled as a single frame structure where components are added sequentially as the switchgear advances along an assembly line. Further, switchgear is made-to-order according to specifications of an end-use customer that relate to, for example, the placement of circuit breaker compartments or busbar assembly configuration. Switchgear is therefore highly configurable in terms of components housed therein and typically cannot be pre-built until the specifications for the final configuration are known. As a result, all the components are assembled in sequence along the assembly line. The sequential assembly creates throughput issues during manufacture as assembly cannot continue along the assembly line if a single component is missing or unavailable at the time the component is required to be sequentially added to the assembly.

In addition to assembly issues, shipment, installation, and repair of existing switchgear is limited in terms of flexibility due to the single frame structure of switchgear. In particular, switchgear is usually shipped as a single structure, which often requires special shipping means as switchgear may often exceed dimensional restrictions (e.g., height) on standard box trucks. Moreover, installation of switchgear may be difficult as the single structure is difficult to maneuver and is often needed to fit within an area with low overhead. Finally, single structure switchgear is not easily disassembled. In many instances, an isolated fault occurring in a single compartment may require disassembly of a large portion of switchgear to gain access to the compartment experiencing the isolated fault.

Accordingly, there is a need to provide modular switchgear that has greater flexibility in manufacture, shipment, installation, and/or repair and overcomes existing shortcomings and challenges associated with current switchgear technology.

BRIEF DESCRIPTION

In one aspect, an electrical enclosure includes a main cabinet and a modular cabinet removably secured to the main cabinet. The main cabinet includes a bus compartment that includes a busbar assembly, and the bus compartment is located between an end wall of the main cabinet and a partition opposite the end wall. The modular cabinet is comprised of at least two interlocking compartment modules. Each compartment module interlocks with at least one adjacent compartment module. Each compartment module includes a first side panel and a second side panel. Each side panel includes at least one alignment member that engages an alignment member of a respective side panel of at least one adjacent compartment module. Each compartment module also includes a base that extends between the first side panel and the second side panel and a terminal wall that joins a side of the first side panel and a side of the second side panel. The terminal walls of the interlocking compartment modules engage to form a structural wall of the modular cabinet. The structural wall is oriented toward the partition of the main cabinet when the main cabinet and the modular cabinet are secured.

In another aspect, a modular cabinet for use in an electrical enclosure is comprised of at least two compartment modules, where each compartment module interlocks with at least one adjacent compartment module. Each compartment module includes a first side panel and a second side panel. Each side panel includes at least one alignment member that engages an alignment member of a respective side panel of at least one adjacent compartment module. Each compartment module also includes a base that extends between the first side panel and the second side panel, an interior structure that extends from the base, and a terminal wall that joins a side of the first side panel and a side of the second side panel. The terminal wall is spaced from the interior structure to define an exhaust passage therebetween. The exhaust passages of the interlocking compartment modules align to form an exhaust channel extending through the modular cabinet.

In yet another aspect, a method of assembling an electrical enclosure includes providing a main cabinet that has an end wall, a bus compartment that includes a busbar assembly, and a cable compartment located between the end wall and the bus compartment. The method also includes forming a modular cabinet by interlocking a first compartment module with a second compartment module. At least one of the first and second compartment modules houses a circuit breaker. Each compartment module comprises first and second side panels. Each side panel has at least one alignment member. Interlocking the compartment modules includes engaging the at least one alignment member of each side panel of the first compartment module with the at least one alignment member of each side panel of the second compartment module. The method further includes electrically connecting the circuit breaker housed in the at least one of the first and second compartment modules to the busbar assembly. The method also includes removably securing the main cabinet to the modular cabinet.

DETAILED DESCRIPTION

Figure 1:
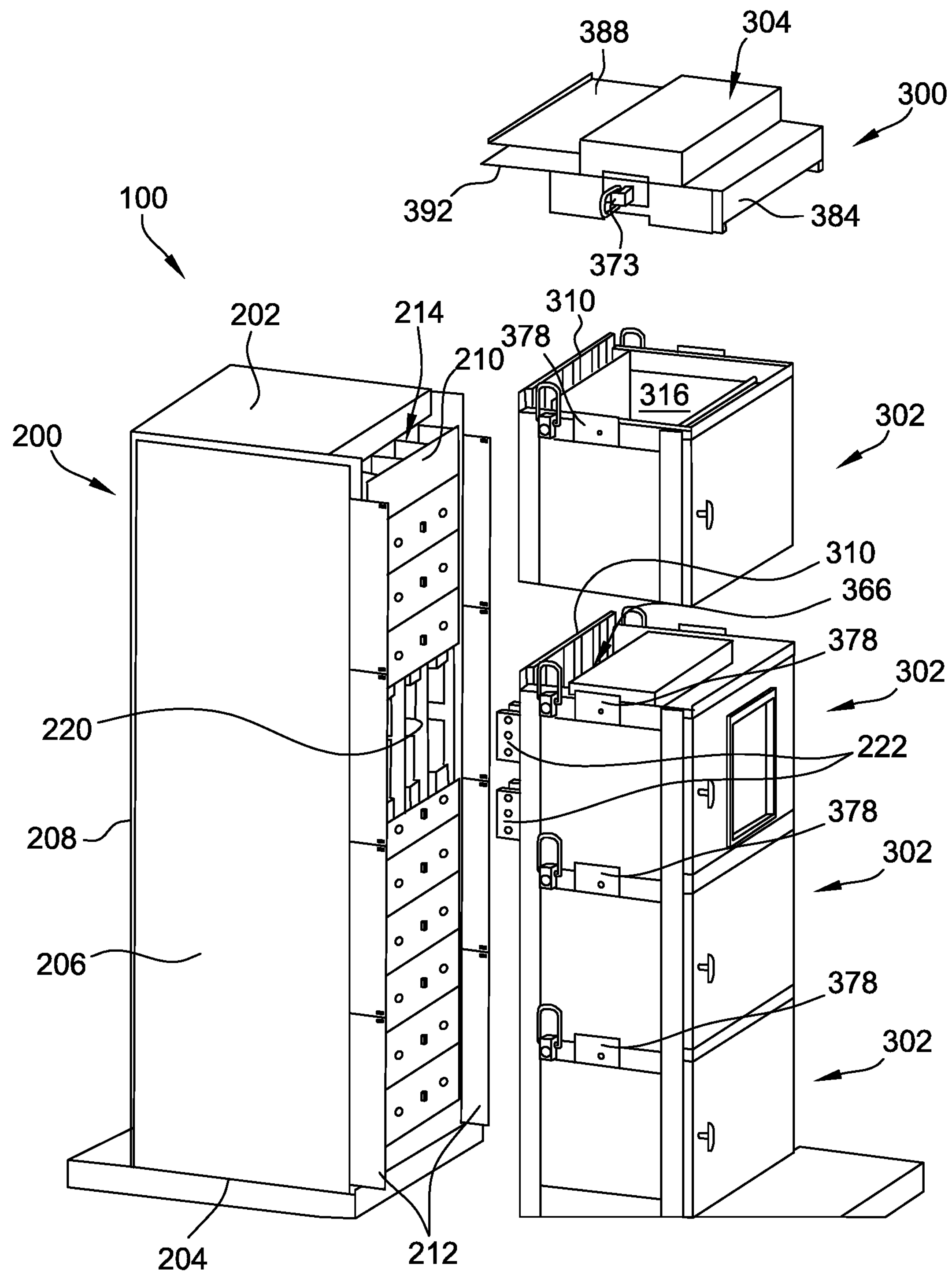
FIG. 1 is a perspective view of an exemplary electrical enclosure having a modular cabinet.
Figure 2:
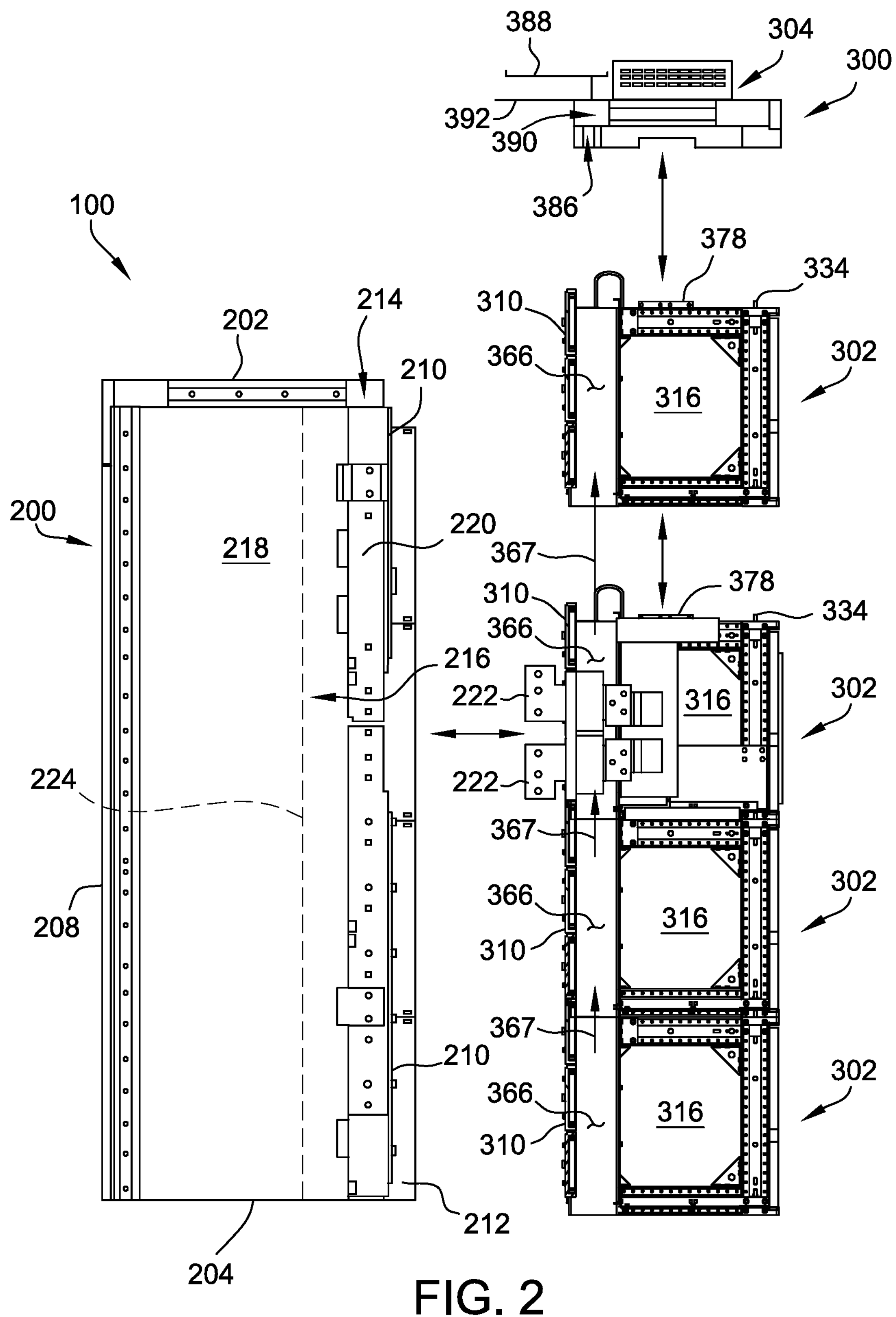
FIG. 2 is a cross-sectional side view of the electrical enclosure shown in FIG. 1.

Referring to FIGS. 1 and 2, an exemplary electrical enclosure 100 is shown. In the exemplary embodiment, electrical enclosure 100 is a low-voltage switchgear 100. As used herein, the term "switchgear" refers to an electrical enclosure that includes electrical disconnect switches, fuses or circuit breakers used to control, protect, and isolate electrical equipment. The term "low-voltage" refers to switchgear operating at voltages lower than 2 kV. Switchgear 100 includes a main cabinet 200 and a modular cabinet 300. Main cabinet 200 includes a first wall 202, a second wall 204, sidewalls 206, and end wall 208. In the exemplary embodiment, first wall 202 is a top wall 202 and second wall 204 is a bottom wall 204 opposite the top wall 202. Main cabinet 200 also includes a partition 210 opposite end wall 208. Side plates 212 extend outward from partition 210 and enable modular cabinet 300 to be removably secured to main cabinet 200, as described in more detail herein. In some embodiments, side plates 212 are secured to main cabinet 200 prior to removably securing main cabinet 200 and modular cabinet 300. In other embodiments, main cabinet 200 and modular cabinet 300 are joined and side plates 212 are subsequently installed to removably secure main cabinet 200 and modular cabinet 300. Partition 210 includes openings formed thereon that enable access to interior components of main cabinet 200. An air flow gap 214 is formed at a corner of main cabinet 200 where top wall 202 and partition 210 intersect. Air flow gap 214 enables an outflow of gases and other undesired emissions formed, for example, by an arc event within main cabinet 200 during operation. End wall 208, sidewalls 206 and/or top wall 202 may include additional ventilation means (e.g., ventilation openings) to enable the outflow of gases and other undesired emissions from main cabinet 200.

Main cabinet 200 also includes a bus compartment 216 and a cable compartment 218. Bus compartment 216 and cable compartment 218 are housed within main cabinet 200 between partition 210 and end wall 208. Bus compartment 216 houses a busbar assembly 220. Busbar assembly 220 includes vertical busbars that supply current to circuit breakers housed in modular cabinet 300 (e.g., circuit breaker 306 shown in FIG. 12) via run-in buses 222, and horizontal busbars that supply current to the vertical busbars. Cable compartment 218 houses cables and other ancillary components of switchgear 100. In the exemplary embodiment, bus compartment 216 is located between cable compartment 218 and partition 210. The locations of bus compartment 216 and cable compartment 218 within main cabinet 200 are not intended to be limited to the exemplary embodiment, and may vary to enable switchgear 100 to function for its desired application. Moreover, in some embodiments, bus compartment 216 may be isolated from cable compartment 218 by an interior wall 224. In other embodiments, bus compartment 216 and cable compartment 218 may not physically be segregated, but a demarcation line 224 may be defined where components housed in the bus compartment 216 (e.g., busbar assembly 220) end and the components housed in the cable compartment 218 begin.

Modular cabinet 300 is formed of a plurality of interlocking compartment modules 302 and a plenum module 304 that interlocks with one of the compartment modules 302. In the exemplary embodiment, each compartment module 302 may comprise either an auxiliary compartment module 302*a* (shown in FIG. 3) or a circuit breaker compartment module 302*b* (shown in FIG. 9). Each circuit breaker compartment module 302*b* houses a circuit breaker 306 (shown in FIG. 12) and each auxiliary compartment module 302*a* houses electrical components, such as controls, relays, communication devices, indicators, and the like. Any number of circuit breaker compartment modules 302*b* and auxiliary compartment modules 302*a* may be included in modular cabinet 300 to enable switchgear 100 to function for its desired application when modular cabinet 300 is secured to main cabinet 200. Moreover, when assembled and available for use, the compartment modules 302 may interlock in any arrangement so that the configuration of modular cabinet 300 matches a configuration of main cabinet 200. In the exemplary embodiment, the compartment modules 302 interlock to form modular cabinet 300 comprised of vertically aligned compartment modules 302 that form a column of compartment modules 302. In some embodiments, compartment modules 302 may interlock to form modular cabinet 300 comprised of horizontally aligned compartment modules 302 that form a row of compartment modules 302. In other embodiments, compartment modules 302 may interlock to form modular cabinet comprised of both horizontally and vertically aligned compartment modules 302 that form a plurality of rows and a plurality of columns of compartment modules 302.

Each compartment module 302 interlocks with at least one other compartment module 302 to form modular cabinet 300. To enable the compartment modules 302 to interlock, each compartment module 302 includes interlocking features that align with interlocking features of another compartment module 302. More specifically, the interlocking features align with interlocking features of adjacent modules comprising modular cabinet 300. In the exemplary embodiment, each circuit breaker compartment module 302*b* interlocks with at least one auxiliary compartment module 302*a*. In this respect, each circuit breaker compartment module 302*b* and each auxiliary compartment module 302*a* comprises corresponding interlocking features. As described in more detail below, the circuit breaker compartment modules 302*b* may include structural features that are in addition to, or alternative from, structural features of auxiliary compartment module 302*a*.

Figure 3:
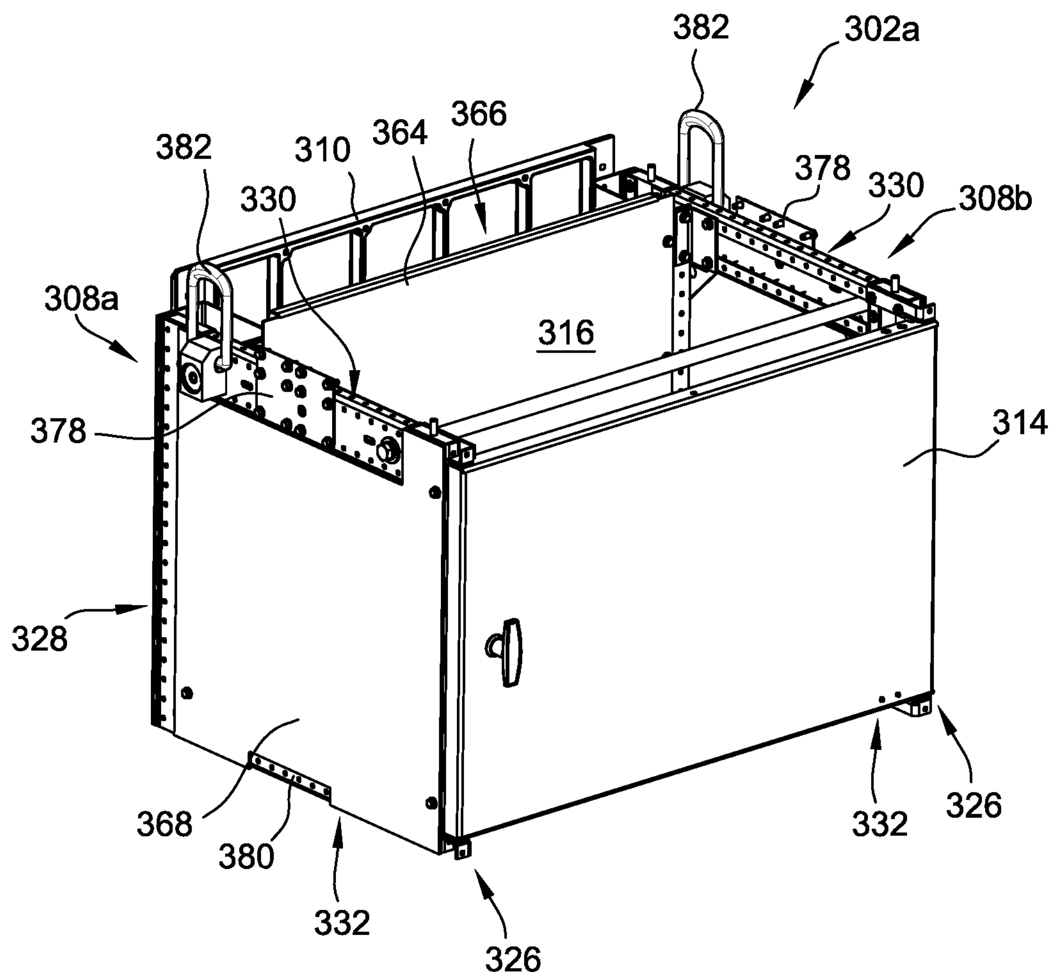
FIG. 3 is an isolated perspective view of a first exemplary compartment module for use as an auxiliary compartment in the electrical enclosure shown in FIGS. 1 and 2.
Figure 8:
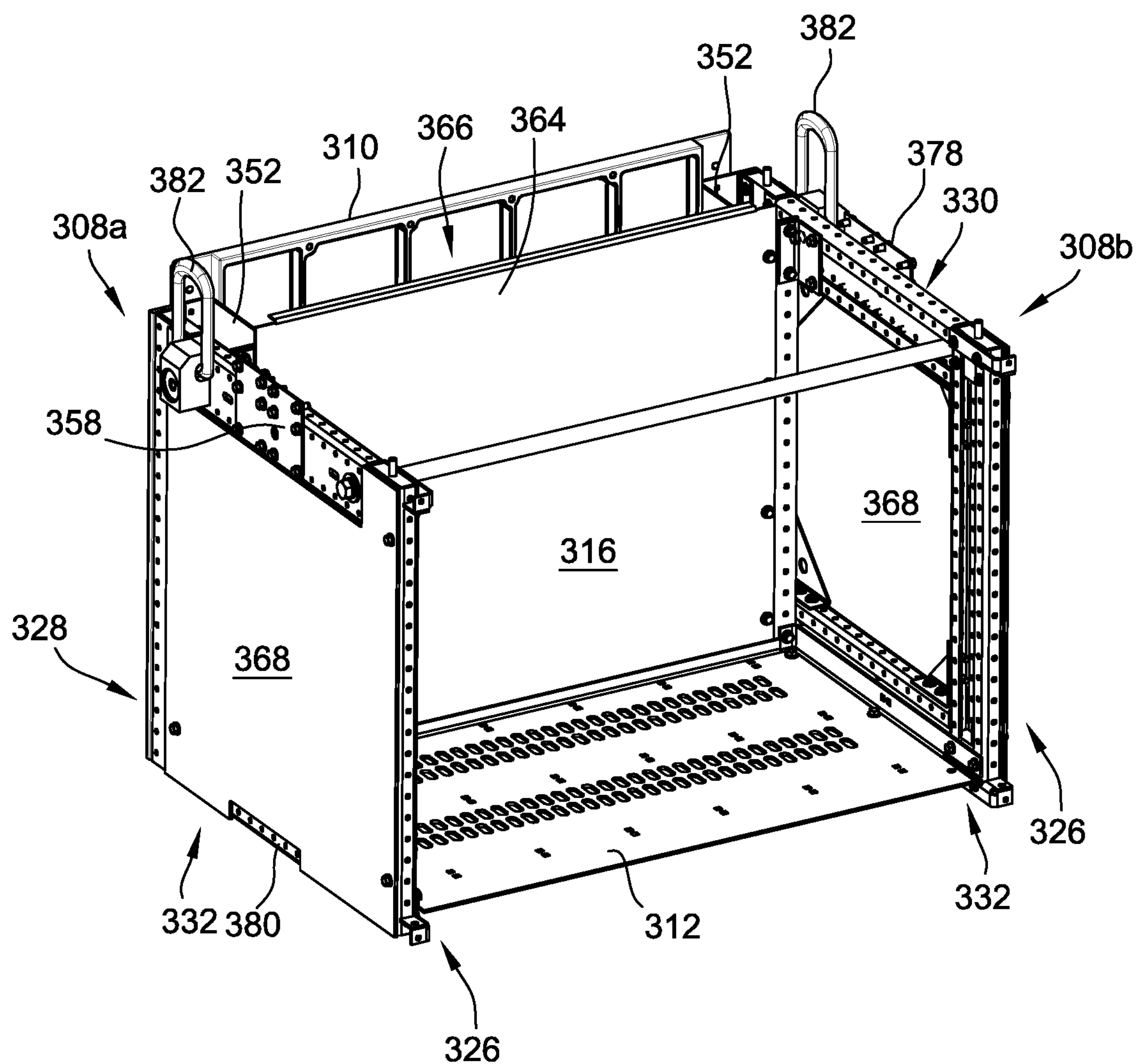
FIG. 8 is a perspective view of the compartment module shown in FIG. 3, shown without a front cabinet door for clearer illustration of an interior of the compartment module.
Figure 9:
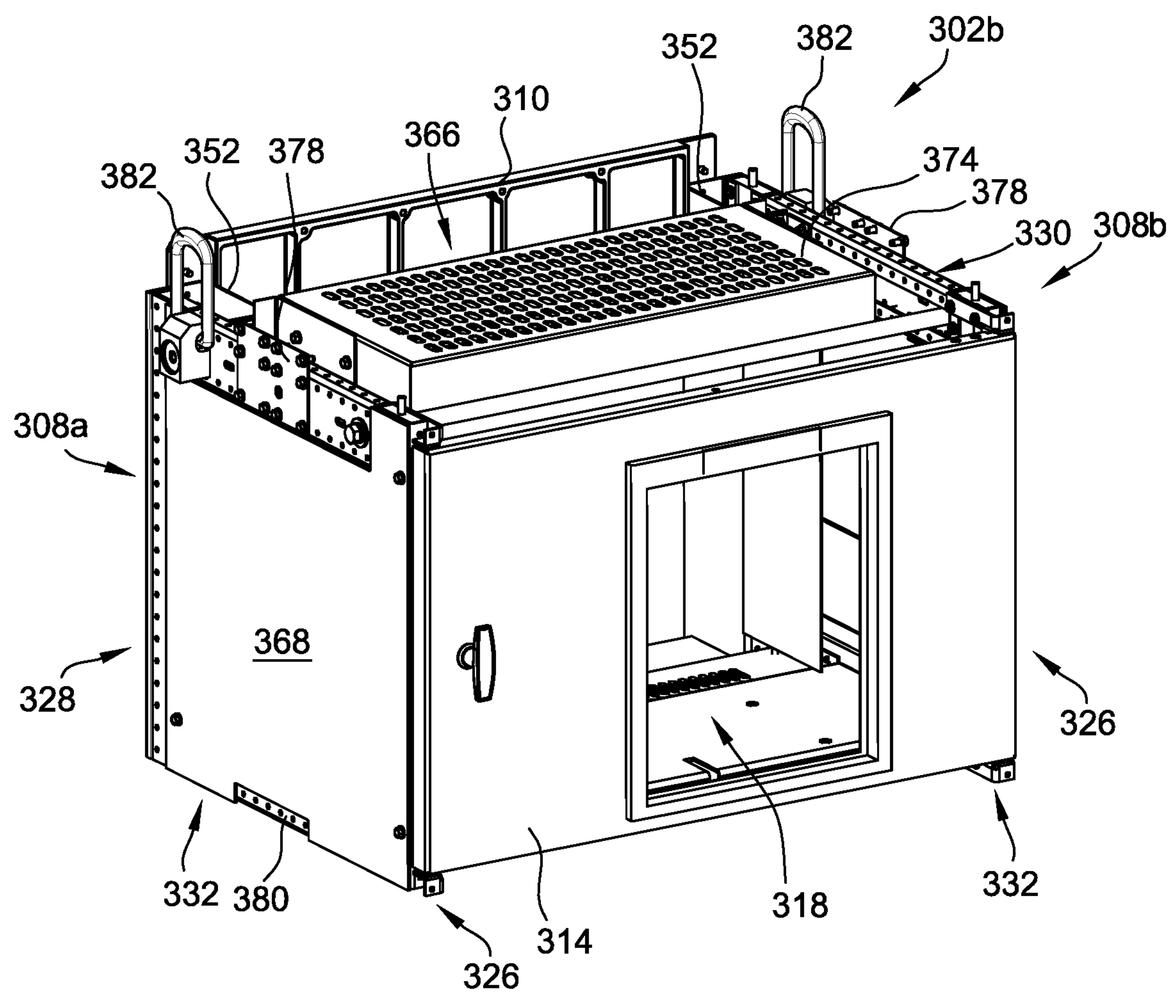
FIG. 9 is a perspective view of a second exemplary compartment module for use as a circuit breaker compartment module in the electrical enclosure shown in FIGS. 1 and 2.

Referring to FIGS. 3 and 9, an exemplary auxiliary compartment module 302*a* (FIG. 3) and an exemplary circuit breaker compartment module 302*b* (FIG. 9) are shown assembled and isolated prior to interlocking with another compartment module 302. Auxiliary compartment module 302*a* and circuit breaker compartment module 302*b* each has a box-like shape and includes side panels 308, more specifically identified as side panels 308*a*, 308*b*, a terminal wall 310 that joins side panels 308*a* and 308*b*, a base 312 (shown in FIGS. 8 and 10) extending between side panels 308*a* and 308*b*, and a compartment door 314 extending between side panels 308 opposite terminal wall 310. Compartment door 314 may be hingedly attached to one of the side panels 308 (e.g., to side panel 308*b*) and enables access to a main interior 316 of each compartment module 302*a,b* when assembled in modular cabinet 300. Compartment door 314 may be formed as a solid door, as is the case for auxiliary compartment module 302*a*, or may include a central opening 318, (shown in FIG. 9) for use with circuit breaker compartment module 302*b*. Central opening 318 may allow a circuit breaker 306 (shown in FIG. 12) housed within circuit breaker compartment module 302*b* to be accessed through compartment door 314.

Figure 4:
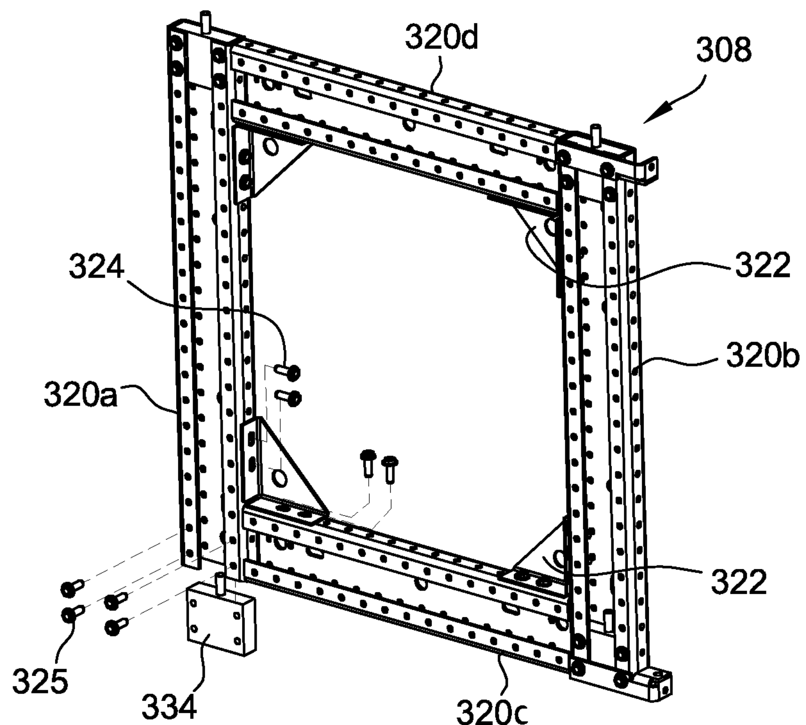
FIG. 4 is an isolated perspective view of a side panel of the auxiliary compartment module shown in FIG. 3.
Figure 5:
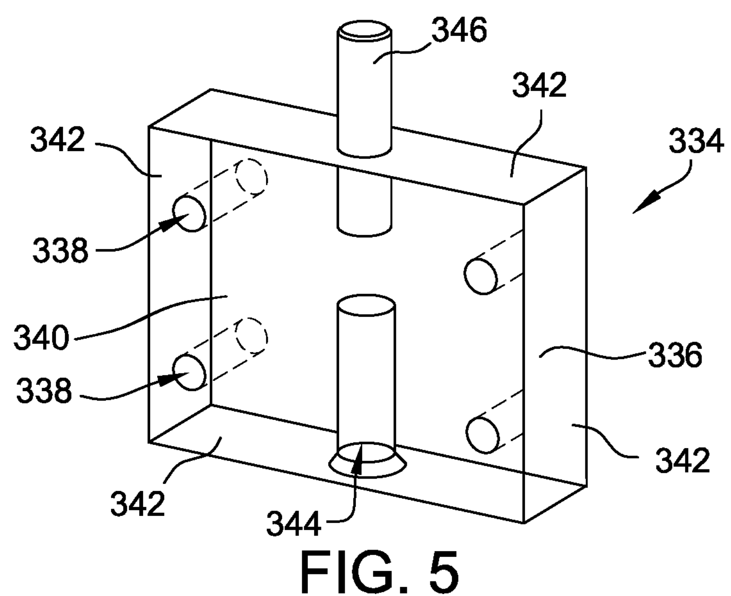
FIG. 5 is an isolated perspective view of an alignment member that is secured to the side panel shown in FIG. 4.
Figure 6:
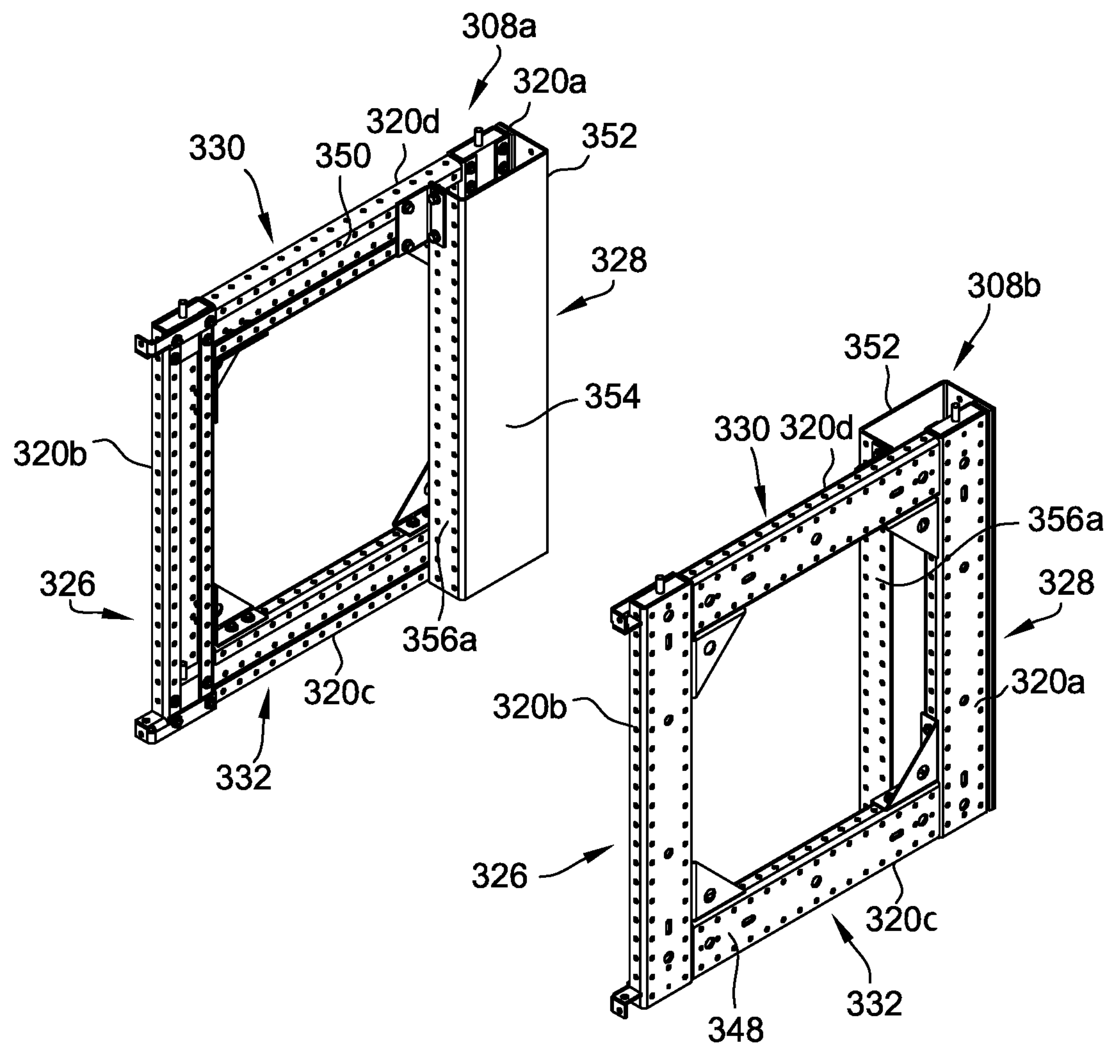
FIG. 6 is an isolated, front perspective view of two side panels oriented as assembled in the auxiliary compartment module shown in FIG. 3 and having a portion of a terminal wall attached thereto.

Referring to FIGS. 4-6, side panels 308*a* and 308*b* of each compartment module 302 have substantially identical, mirror-image construction. Each side panel 308*a* and 308*b* has a rectangular-shaped body that is constructed of four perforated metal panes 320*a,b,c,d*. As assembled, pairs of opposed metal panes are substantially parallel, for example panes 320*a*, 320*b* and 320*c*, 320*d*, and are substantially perpendicular to each pair of adjacent panes, for example pane 320*c* is substantially perpendicular to panes 320*a* and 320*b*. Adjacent metal panes are secured together by interior corner gussets 322 and fasteners 324. When oriented for assembly of a compartment module 302 as shown in FIG. 6, each side panel 308 defines a first side 326 and an opposite, parallel second side 328, a first end 330 and an opposite, parallel second end 332. Alignment members 334, shown in FIGS. 4 and 5 are secured to the intersecting corners of the sides 326 and 328 and ends 330 and 332 of each side panel 308*a* and 308*b* by fasteners 325. In the exemplary embodiment, four alignment members 334 are secured to each side panel 308*a* and 308*b* so that an alignment member 334 is positioned at each corner. In other embodiments, more or fewer alignment members 334 may be provided, and may be secured to side panels 308*a* and 308*b* at locations other than the corners, with the proviso that each compartment module 302 has alignment members 334 secured at locations corresponding to alignment members 334 of an adjacent, interlocking compartment module 302 to enable the alignment members 334 to function as described herein.

As shown in FIG. 5, each alignment member 334 has a block-shaped body 336. Two opposing panes 320*b* and 320*a*, shown in FIGS. 4 and 6 defining the first side 326 and second side 328, respectively, of each side panel 308 may each have a hollow, rectangular body that is sized and shaped to receive the block-shaped body 336 of alignment member 334. Body 336 includes openings 338 extending through opposing face surfaces 340 of body 336. Openings 338 align with perforations formed in side panels 308*a* and 308*b* (e.g., formed in the two opposing panes 320*a* and 320*b* receiving each alignment member 334) and receive fasteners 325 to secure alignment member 334 to the respective corner of the respective side panel 308*a* and 308*b*. Face surfaces 340 are joined by edge surfaces 342. An alignment slot 344 is formed in one of the edge surfaces 342 and an alignment pin 346 is provided at the opposite edge surface 342. Alignment slot 344 is sized and shaped to receive an alignment pin 346 of another alignment member 334 secured to a side panel 308 of another compartment module 302, which alignment pin 346 protrudes outward from the respective side panel 308. In this respect, the alignment members 334 of each compartment module 302 are adapted to engage with alignment members 334 of an adjacent compartment module 302 to align the compartment modules 302 and enable the compartment modules 302 to interlock, as described in more detail herein.

As shown in FIG. 6, side panels 308*a* and 308*b* are parallel and vertically aligned. Panels 308*a* and 308*b* include an outer surface 348 oriented away from the opposite side panel 308*a* or 308*b* and an inner surface 350 oriented toward the other side panel 308*a* or 308*b*. When oriented for assembly, the first side 326 of each side panel 308*a* and 308*b* is a front side to which compartment door 314 (shown in FIGS. 3 and 9) is attached, and the second side 328 opposite the front side 326 is a rear side. Posts 352 are attached to the inner surface 350 of each side panel 308*a* and 308*b* along inner surface 350 adjacent the second side 328. Each post 352 includes a solid side 354 that is spaced from the inner surface 350 of the respective side panel 308*a* and 308*b*, defining a passageway extending therebetween. As oriented in FIG. 6, solid sides 354 of posts 352 are oriented toward each other. Each post 352 also includes perforated sides 356*a* and 356*b* extending from each solid side 354. Perforated side 356*a* of each post 352 is oriented toward first side 326 and perforate side 356*b* of each post 352 is oriented toward second side 328. The perforated sides 356*a* and 356*b* are secured to respective perforated inner surfaces 350 of side panels 308*a* and 308*b* using fastener assemblies.

Figure 7:
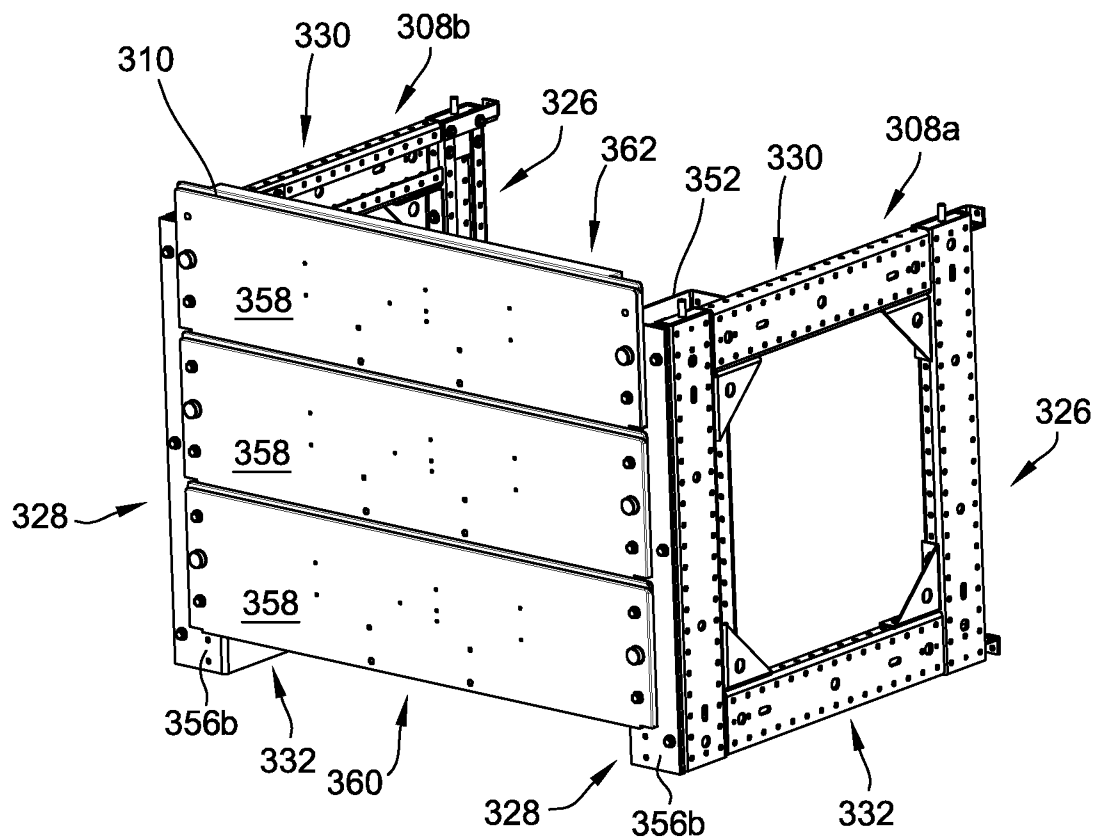
FIG. 7 is an isolated, rear perspective view of the two side panels shown in FIG. 6 having the terminal wall fully assembled and attached thereto.

Referring to FIG. 7, terminal wall 310 of auxiliary compartment module 302*a* is secured to the perforated sides 356*b* of the posts 352. Terminal wall 310 thereby joins the side panels 308*a* and 308*b* at second sides 328. Terminal wall 310 of auxiliary compartment module 302*a* is formed of a series of discrete slabs 358 that are each secured to the perforated sides 356*b*. Each of the slabs 358 has an identical structure and engages an adjacent slab 358 to provide suitable rigidity of terminal wall 310. For example, two slabs 358 may engage via an overlapping tongue and groove fit (shown in FIG. 12). The slabs 358 are arranged such that terminal wall 310 is in offset alignment with post 352. As a result, a first end 360 of terminal wall 310 does not completely extend to a proximate end of the perforated sides 356*b*, and a second end 362 of terminal wall 310 extends beyond a proximate end of the perforated sides 356*b*. When modular cabinet 300 is assembled, the second end 362 of terminal wall 310 engages the first end 360 of the terminal wall 310 of an adjacent interlocking compartment module 302 (e.g., an adjacent circuit breaker compartment module 302*b*) to create the required rigidity between the interlocking compartment modules 302*a* and 302*b*. Terminal wall 310 thereby covers a portion of each of the perforated sides 356*b* of the adjacent compartment module 302 that extends beyond the adjacent terminal wall 310 of the adjacent compartment module 302.

Figure 11:
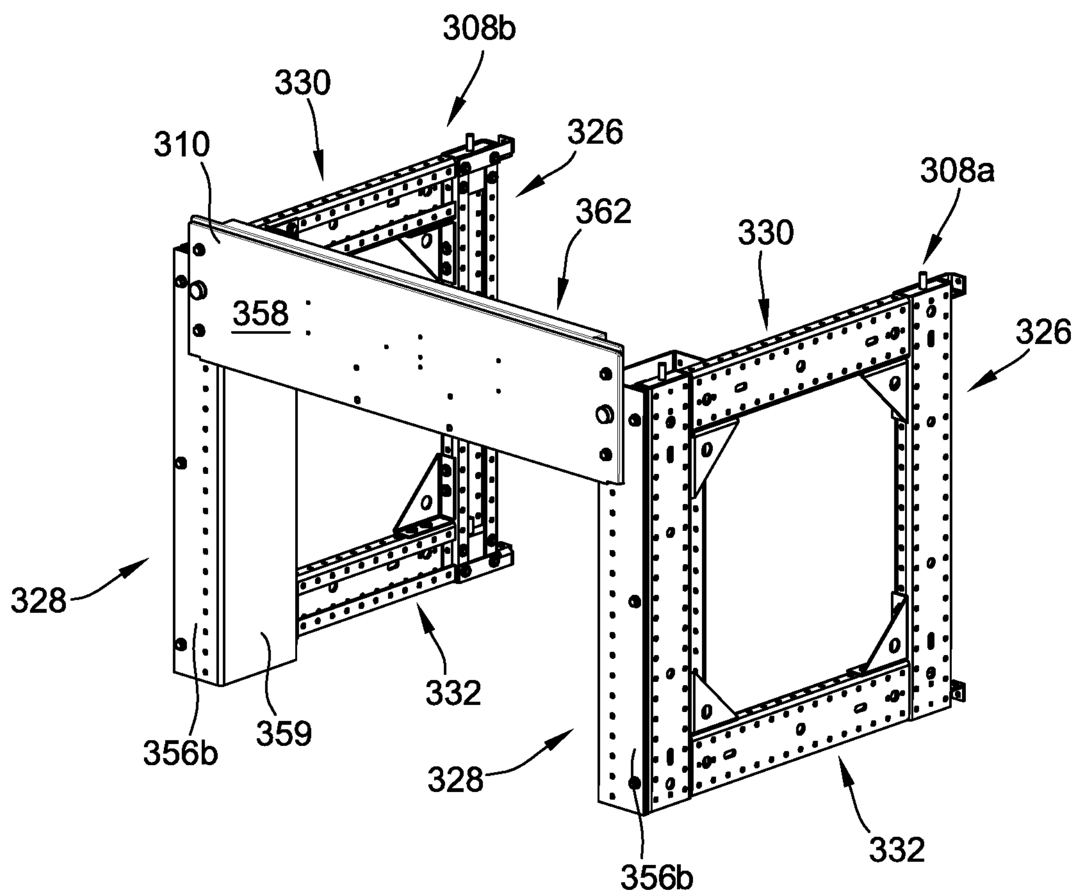
FIG. 11 is an isolated, rear perspective view of two side panels oriented as assembled in the circuit breaker compartment module shown in FIG. 9 and having a terminal wall attached thereto.
Figure 12:
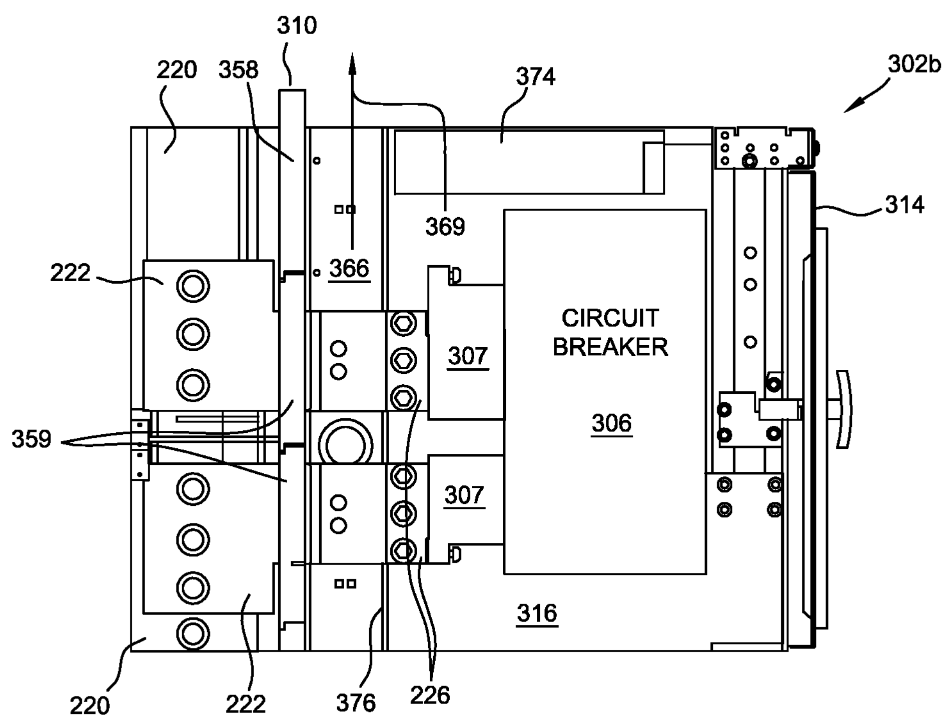
FIG. 12 is a schematic, cross-sectional side view of a portion of the circuit breaker compartment module shown in FIG. 9 having a circuit breaker mounted therein.

Referring to FIG. 11, terminal wall 310 of circuit breaker compartment module 302*b* includes the same elements and features as previously described for use in compartment module 302*a*, except that terminal wall 310 of module 302*b* may include alternative slabs 359 (shown in FIG. 12). The slabs 359 allow run-in buses 222 (shown in FIGS. 1 and 2) to extend through the slabs 359 and electrically connect circuit breaker 306 housed in compartment module 302*b* to busbar assembly 220 of main cabinet 200. Alternative slabs 359 are identical to slabs 358 except that the alternative slabs include holes that are sized and shaped to receive run-in buses 222. Slab 358 and the alternative slabs 359 form a terminal wall 310 of compartment module 302*b* that is identical to terminal wall 310 of compartment module 302*a* shown in FIG. 7, except that terminal wall 310 of compartment module 302*b* also includes the holes that are formed in the alternative slabs for the run-in buses 222 to extend through terminal wall 310.

With additional reference to FIG. 2, the terminal walls 310 of each of the plurality of interlocking compartment modules 302 engage a terminal wall 310 of an adjacent, interlocking compartment module 302. In particular, a first end 360 of a terminal wall 310 of a compartment module 302 engages the second end 362 of an adjacent terminal wall 310 of an interlocking compartment module 302 (e.g., via an overlapping tongue and groove fit shown in FIG. 12). As a result, the engaging terminal walls 310 of the interlocking compartment modules 302 create a structural wall of modular cabinet 300. The structural wall of modular cabinet 300 is oriented toward partition 210 of main cabinet 200 when modular cabinet 300 is removably secured to main cabinet 200.

Referring to FIG. 8, auxiliary compartment module 302*a* also includes an interior wall 364. Interior wall 364 extends from base 312 adjacent posts 352, and is secured to the perforated sides 356*a* of posts 352. Interior wall 364 is substantially solid and is spaced from terminal wall 310. Together, terminal wall 310, interior wall 364, and solid sides 354 of posts 352 define an exhaust passage 366 that extends through compartment module 302*a*. Interior wall 364 separates main interior 316 of compartment module 302*a* from exhaust passage 366. Side plates 368 may be secured to the outer surfaces 348 of side panels 308*a* and 308*b* to isolate main interior 316 from the exterior of modular cabinet 300, together with compartment door 314 (shown in FIG. 3). Main interior 316 may remain exposed by an open end of compartment module 302*a* opposite base 312 until the compartment module 302*a* interlocks with another compartment module 302, such that the adjacent base 312 of the interlocking compartment module 302 closes the open end of compartment module 302*a* opposite base 312.

Figure 10:
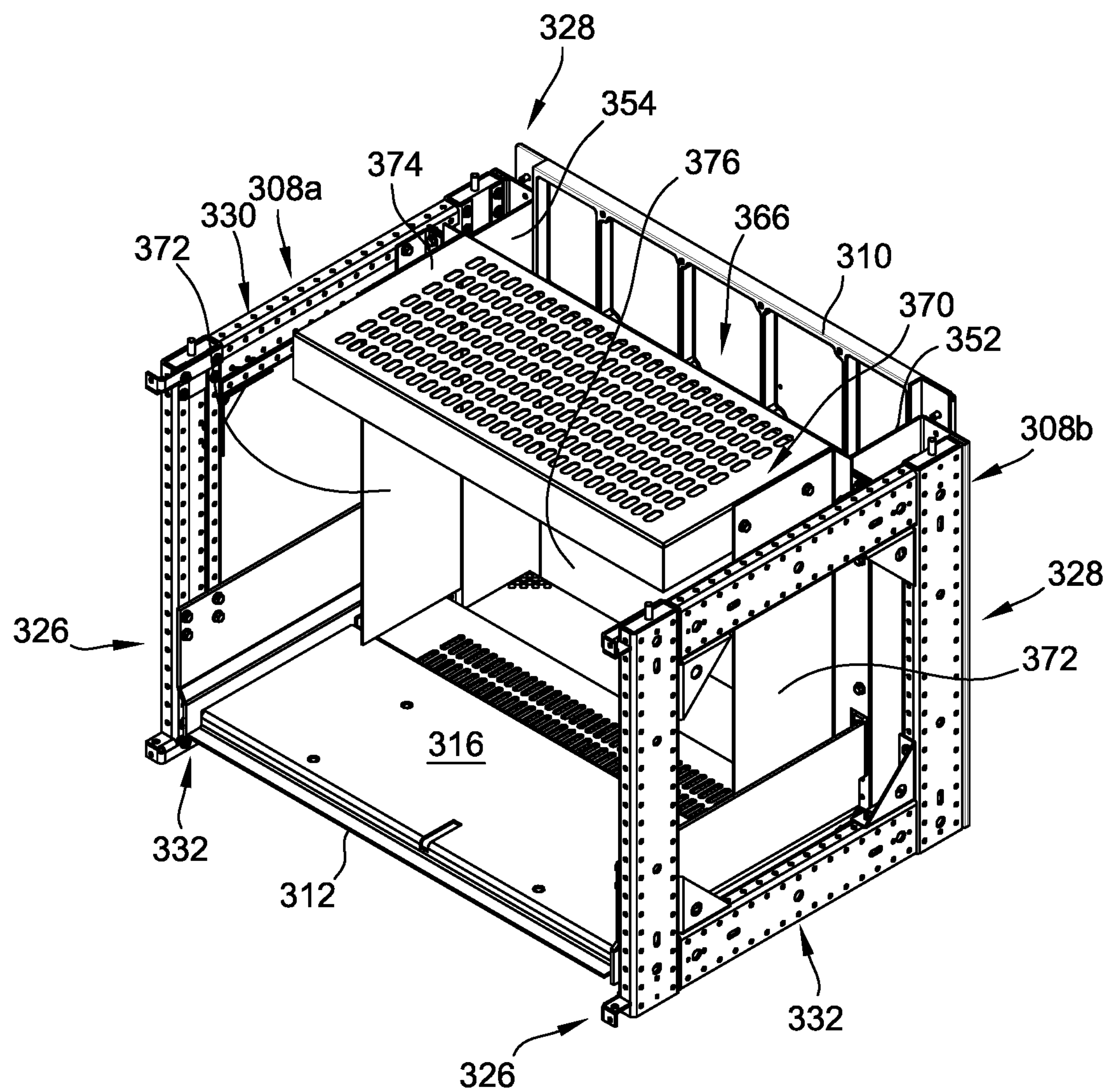
FIG. 10 is a top perspective view of the circuit breaker compartment module shown in FIG. 9, partially disassembled for clearer illustration of an interior of the compartment module.

Referring to FIG. 10, circuit breaker compartment module 302*b* includes an interior housing 370 that encloses circuit breaker 306 housed in compartment module 302*b*. Interior housing 370 has side walls 372 that extend from base 312 and are secured to the perforated sides 356*a* of posts 352. A vented plate 374 extends between side walls 372 opposite base 312 and projects outward toward first end 166. Interior housing 370 also includes a back plate 376 that is spaced from terminal wall 310. Back plate 376 is substantially solid and may include holes (not shown) that are sized and shaped to allow run-in buses 222 (shown in FIGS. 1 and 2) to extend therethrough and electrically connect circuit breaker 306 to busbar assembly 220. Together, terminal wall 310, back plate 376, and solid sides 354 of posts 352 define an exhaust passage 366 that extends through compartment module 302*b*. Vented plate 374 includes apertures that enable a main interior 316 of compartment module 302*a* to be fluidly connected to exhaust passage 366. Side plates 368 (shown in FIG. 9) may be secured to the outer surfaces 348 of side panels 308*a* and 308*b* to isolate main interior 316 from the exterior of modular cabinet 300, together with compartment door 314 (shown in FIG. 9). Main interior 316 may remain exposed by the side of compartment module 302*b* opposite base 312 until the compartment module 302*b* interlocks with another compartment module 302, such that the adjacent base 312 of the interlocking compartment module 302 closes the open end of compartment module 302*b* opposite base 312. When interlocked with another compartment module 302, vented plate 374 of compartment module 302*b* is spaced from the adjacent base 312 of the interlocking compartment module 302 and an opening to exhaust passage 366 is defined between vented plate 374 and the adjacent base 312 such that fluidic connection between main interior 316 of compartment module 302*b* and exhaust passage 366 is maintained.

Referring to FIG. 12, a schematic illustration of circuit breaker 306 housed in main interior 316 of circuit breaker compartment module 302*b* is shown with circuit breaker 306 electrically connected to busbar assembly 220 of main cabinet 200. Main interior 316 of compartment module 302*b* is fluidly connected to exhaust passage 366 by an opening adjacent vented plate 374. Thereby, gases 369 that are formed in main interior 316 of compartment module 302*b*, for example, when an arc event occurs, are enabled to flow out from main interior 316 into exhaust passage 366, and are directed out from modular cabinet 102 as gases 371 through an exhaust channel 367 (shown in FIG. 2) as explained in more detail below. Electrical connection between circuit breaker 306 and busbar assembly 220 is established via run-in buses 222 that connect at one end to busbar assembly 220 and connect at another end to conductive stab tips 226 inserted into disconnect points 307 of circuit breaker 306. Run-in buses 222 extend from busbar assembly 220 through each of partition 210, slabs 359 of terminal wall 310, exhaust passage 366, and back plate 376 of interior housing 370.

Referring to FIGS. 3 and 9, when the auxiliary compartment module 302*a* and circuit breaker compartment module 302*b* are oriented for interlocking assembly to form modular cabinet 300, the first end 330 of side panels 308 defines a top end and the second end 332 of side panels defines a bottom end. Alignment members 334 secured to side panels 308 at first end 330 have alignment pins 346 (shown in FIG. 5) extending outward from first end 330. Alignment members 334 secured to side panels 308 at second end 332 have alignment slots 344 (shown in FIG. 5) oriented to receive adjacent alignment pins 346 extending from first end 330 of an interlocking compartment module 302. Each of the compartment modules 302*a,b* also includes an attachment plate 378 secured to each side panel 308 at first end 330 between alignment members 334. Attachment plates 378 include apertures that align with perforations on side panels 308 at second end 332 of an adjacent, interlocking compartment module 302 so that attachment plates 378 can be secured to the adjacent second end 332 of another compartment module 302 using fasteners. Recesses 380 are formed in side plates 368 at second end 332 that expose perforations at second end 332 that align with apertures formed on an adjacent attachment plate 378 of an interlocking compartment module 302. The aligning apertures of the attachment plate 378 and perforations at second end 332 receive fasteners so that compartment module 302*a,b* can be removably secured to the other compartment module 302 when interlocked. Each of the compartment modules 302*a,b* also includes lifting provisions 382 secured to side panels 308 at first end 330 between attachment plate 378 and one of the alignment members 334. Lifting provisions 382 enable each compartment module 302*a,b* to be separated from an interlocking compartment module 302 and break an interlock between the two after the attachment plate 378 has been detached from the adjacent second end 332.

Referring to FIG. 2, when modular cabinet 300 is formed from the plurality of interlocking compartment modules 302, the exhaust passages 366 of the compartment modules 302 align to form a continuous exhaust channel 367 that extends through modular cabinet 300. In the exemplary embodiment, the plurality of compartment modules 302 interlock in vertical arrangement so that the discrete exhaust passages 366 are aligned to form continuous exhaust channel 367 that extends substantially vertically through the vertical length of modular cabinet 300. Plenum module 304 defines a roof of modular cabinet 300. Plenum module 304 has a body 384 that interlocks with a first end 330 of side panels 308 of one of the compartment modules 302 forming modular cabinet 300. Body 384 may include alignment members (not shown) that align with and engage alignment members 334 of the interlocking compartment module 302. Body 384 may also include holes (not shown) formed thereon that align with apertures formed in attachment plate 378 of the interlocking compartment module 302 and receive fasteners to secure body 384 to the interlocking compartment module 302. Lifting provisions 383 are secured to body 384 that enable plenum module 304 to be separated from the interlocking compartment module 302. Plenum module 304 has a first vent passage 386 that extends through body 384 to vent duct 388 that defines an opening exposed outwardly of modular cabinet 300. Vent passage 386 has an inlet oriented toward continuous exhaust channel 367 extending through modular cabinet 300 and vent passage 386 fluidly connects vent duct 388 to exhaust channel 367. Together, exhaust channel 367, vent passage 386, and vent duct 388 enable a flow of cooling air, and/or gases (e.g., gases 369 shown in FIG. 12) and other undesired emissions formed, for example, when an arc event occurs within a compartment module 302 during operation, to flow out (e.g., as gases 371 shown in FIG. 12) from modular cabinet 300. Cooling air may be provided and directed through exhaust channel 367 by a fan module (not shown) included with modular cabinet 300. The fan module may be an integral component of one or more of the compartment modules 302, or may be a separate interlocking module that forms modular cabinet 300 with compartment modules 302 and plenum module 304. The interior structures (e.g., interior wall 364 or interior housing 370) of compartment modules 302 spaced from the structural wall formed by terminal walls 310 isolate the main interior 316 of each compartment module 302 from gases that may flow through exhaust channel 367.

Plenum module 304 may also have a second vent passage 390 that extends through body 384 to vent duct 388. Second vent passage 390 has an inlet oriented toward air flow gap 214 of main cabinet 200 when modular cabinet 300 is removably secured to main cabinet 200. Second vent passage 390 may be isolated from first vent passage 386, or first and second vent passages 386 and 390 may be formed from a continuous opening formed in body 384. Vent duct 388 has a floor 392 that extends beyond the structural wall of modular cabinet 300 formed by terminal walls 310. Floor 392 covers air flow gap 214 to direct the outflow of gases and other emissions formed in main cabinet 200 during operation to inlet of second vent passage 390. Thereby, the gases and other emissions formed in main cabinet 200 may flow through second vent passage 390 and outward from plenum module 304 through the outwardly exposed opening of vent duct 388.

Assembly of switchgear 100 will now be described. Referring to FIGS. 1 and 2, assembling switchgear 100 includes providing main cabinet 200 that is configured for the desired application of switchgear 100. For example, main cabinet 200 includes busbar assembly 220 that may be specifically configured according to end-customer specifications of switchgear 100. Moreover, main cabinet 200 may be provided before modular cabinet 300 is assembled and as soon as the desired configuration of switchgear 100 is known.

Assembling switchgear 100 also includes forming modular cabinet 300 by interlocking a plurality of compartment modules 302. Each compartment module 302 may be independently manufactured prior to forming modular cabinet 300. In the exemplary embodiment, forming modular cabinet 300 includes interlocking a plurality of compartment modules 302 in vertical arrangement. In this respect, a compartment module 302 is first provided that serves as a base compartment module 302, and a series of compartment modules 302 are successively stacked onto, and interlocked with, an immediately preceding compartment module 302, up to an uppermost compartment module 302. For each interlocking relation between two compartment modules 302, a first compartment module 302 is provided and a second or a next adjacent compartment module 302 is stacked onto, and interlocked with, the first compartment module 302. In the exemplary embodiment, for each interlocking relation, the first compartment module 302 may be referred to as the bottom compartment module 302 and the next adjacent compartment module 302 may be referred to as the top compartment module 302. However, the terms “base”, “uppermost”, “bottom” and “top” are used solely for ease of description purposes, and should not be considered limiting to the arrangement of compartment modules 302 to form modular cabinet 300.

Interlocking two adjacent compartment modules 302 will now be described. Interlocking a first compartment module 302 with a next adjacent compartment module 302 includes engaging alignment members 334 secured to first end 330 of side panels 308*a* and 308*b* of the first compartment module 302 with alignment members 334 secured to second end 332 of side panels 308*a* and 308*b* of the next adjacent compartment module 302. In particular, as discussed above, alignment members 334 secured to second ends 332 of side panels 308*a* and 308*b* of the next adjacent compartment module 302 each include an alignment slot 344 that receives an alignment pin 346 of a corresponding alignment member 334 secured to first ends 330 of side panels 308*a* and 308*b* of the first compartment module 302. In addition, interlocking the first compartment module 302 to the next adjacent compartment module 302 includes engaging second end 362 of terminal wall 310 of the first compartment module 302 with first end 360 of terminal wall 310 of the next adjacent compartment module 302. Engaging the first and second ends 360 and 362 of the respective terminal walls 310 may include fitting the ends 360 and 362 together via an overlapping tongue and groove fit, described above and shown in FIG. 12. As discussed above, terminal walls 310 of the plurality of interlocking compartment modules 302 respectively engage adjacent terminal walls 310 to create a structural wall of modular cabinet 300. Further, as discussed above, the exhaust passages 366 of each pair of interlocking compartment modules 302 align so that an exhaust channel 367 extending through the modular cabinet 300 is formed. Attachment plates 378 secured to first ends 330 of side panels 308*a* and 308*b* of the first compartment module 302 may be respectively secured to the perforated second ends 332 of side panels 308*a* and 308*b* of the next adjacent compartment module 302 to removably secure the adjacent, interlocking compartment modules 302.

Adjacent compartment modules 302 are interlocked as described above until switchgear is assembled for the required switchgear use. Once all of the compartment modules 302 have been manufactured and interlocked, forming modular cabinet 300 may continue by interlocking plenum module 304 with uppermost compartment module 302 of modular cabinet 300. Plenum module 304 may interlock with uppermost compartment module 302 by engaging alignment members (not shown) secured to body 384 of plenum 304 that are oriented to engage alignment members 334 secured to first end 330 of uppermost compartment module 302. In addition, body 384 of plenum 304 may be removably secured to attachment plates 378 secured to first ends 330 of side panels 308*a* and 308*b* of uppermost compartment module 302. In some embodiments, plenum module 304 may not be interlocked onto modular cabinet 300 until after modular cabinet 300 is removably secured to main cabinet 200.

In the exemplary embodiment, assembling switchgear 100 also includes electrically connecting a circuit breaker 306 housed in modular cabinet 300 to busbar assembly 220 housed in main cabinet 200. At least one compartment module 302 of modular cabinet 300 comprises a circuit breaker compartment module 302*b* that houses a circuit breaker 306. As described above, circuit breaker 306 is electrically connected to busbar assembly 220 to enable switchgear 100 to function for its desired application. In this respect, forming modular cabinet 300 includes interlocking compartment modules 302 in an arrangement that facilitates electrical connection of circuit breaker 306 and busbar assembly 220. Such an arrangement of compartment modules 302 may be known and defined prior to manufacturing compartment modules 302 and interlocking compartment modules 302 to form modular cabinet 300. Therefore, when modular cabinet 300 is formed, the circuit breaker compartment module 302*b* is appropriately positioned so that electrical connection between circuit breaker 306 and busbar assembly 220 can be established. Electrically connecting circuit breaker 306 and busbar assembly 220 includes connecting run-in buses 222 to busbar assembly 220 and to stab tips 226 inserted in disconnect points 307 of circuit breaker 306. Connecting run-in buses 222 to busbar assembly 220, and/or connecting run-in buses 222 to circuit breaker 306, may be performed prior to, during, or after removably securing modular cabinet 300 to main cabinet 200.

Assembling switchgear 100 further includes removably securing modular cabinet 300 to main cabinet 200. Modular cabinet 300 is positioned so that structural wall formed by terminal walls 310 of interlocking compartment modules 302 is adjacent partition 210 of main cabinet 200. Side plates 212 may be secured to main cabinet 200 prior to removably securing modular cabinet 300 to main cabinet 200, such that side plates 212 extend outward from partition 210 and are oriented to be secured to second sides 328 of side panels 308*a* and 308*b* of compartment modules 302. In other embodiments, main cabinet 200 and modular cabinet 300 are joined and side plates 212 are subsequently installed to removably secure main cabinet 200 and modular cabinet 300. Side plates 212 include holes that align with perforations formed in the outer surface 348 of the second sides 328 of side panels 308*a* and 308*b*, and the aligning holes and perforations receive fasteners to removably secure modular cabinet 300 to main cabinet 200.

Assembled switchgear 100 may also be readily disassembled. Quick disassembly may be advantageous in cases where an isolated fault occurs in one of the compartment modules 302, and repair of switchgear 100 simply requires repair of the single damaged compartment module 302. To facilitate disassembly of switchgear 100, modular cabinet 300 is first separated from main cabinet 200 by detaching side plates 212 from side panels 308*a* and 308*b* of each of the compartment modules 302. Plenum module 304 is also separated from uppermost compartment module 302 before, during, or after detaching side plates 212 from side panels 308. Plenum module 304 and compartment modules 302 may be successively removed from modular cabinet 300 by detaching attachment plates 378 secured to of a bottom compartment module 302 from the second end 332 of a top compartment module 302 (or from body 384 of plenum module 304) and lifting each detached compartment module 302 using lifting provisions 382 or detached plenum module 304 using lifting provisions 383. Once the damaged compartment module 302 is reached, it may be removed and repaired and/or replaced. Switchgear 100 may then be reassembled as described above.

The above-described embodiments of modular switchgear provide technical advantages by facilitating greater flexibility in the manufacturing and repair process of switchgear. More particularly, the embodiments described herein provide a modular cabinet for switchgear that includes a plurality of interlocking compartment modules that can be independently and simultaneously manufactured. This facilitates increasing throughput during manufacture of switchgear compared to conventional systems and methods, in which switchgear is formed of a single frame structure and requires sequential operations to assemble the various components and compartments comprising the switchgear. Moreover, the modular components of switchgear according to the present disclosure may be individually shipped and installed directly at an end-customer's site, which may facilitate reducing shipping costs and providing greater installation flexibility. Modular components further may facilitate reducing time and costs associated with switchgear repair, by enabling switchgear to be readily disassembled to remove, repair and/or replace a single damaged component.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical enclosure comprising:

a main cabinet comprising a bus compartment, the main cabinet having an end wall and a partition opposite the end wall, the bus compartment located between the partition and the end wall, the bus compartment comprising a busbar assembly; and a modular cabinet removably secured to the main cabinet, the modular cabinet comprised of at least two interlocking compartment modules, wherein each of the interlocking compartment modules interlocks with at least one adjacent one of the interlocking compartment modules, each of the interlocking compartment modules comprising:

a first side panel and a second side panel, each of the first and second side panels comprising at least one alignment member, wherein each of the at least one alignment member engages the at least one alignment member of a respective one of the first and second side panels of the at least one adjacent one of the interlocking compartment modules;

a base extending between the first side panel and the second side panel; and a terminal wall joining a side of the first side panel and a side of the second side panel;

wherein the terminal walls of the interlocking compartment modules engage to form a structural wall of the modular cabinet, the structural wall oriented toward the partition of the main cabinet when the main cabinet and the modular cabinet are secured to each other.

2. The electrical enclosure of claim 1, wherein the main cabinet is removably secured to the modular cabinet by a first plate and a second plate each removably secured to the main cabinet, wherein the first plate and the second plate are removably secured to the first side panel and the second side panel, respectively, of each compartment module.

3. The electrical enclosure of claim 1, wherein each of the interlocking compartment modules comprises an interior structure extending from the base, the interior structure spaced from the terminal wall to define an exhaust passage therebetween, wherein the exhaust passages of the at least two interlocking compartment modules align to form an exhaust channel extending through the modular cabinet.

4. The electrical enclosure of claim 3, wherein the modular cabinet further comprises a plenum module, the plenum module comprising a body that interlocks with one of the at least two interlocking compartment modules, and a vent passage extending through the body to an opening exposed outwardly of the modular cabinet, the vent passage having an inlet fluidly connected to the exhaust channel.

5. The electrical enclosure of claim 4, wherein the plenum module further comprises a second vent passage extending through the body to the outwardly-exposed opening and a vent duct defining the outwardly-exposed opening, the vent duct comprising a floor that extends beyond the structural wall of the modular cabinet and at least partially encloses the bus compartment of the main cabinet when the main cabinet and the modular cabinet are secured to each other, wherein an interior of the bus compartment is fluidly connected to an inlet of the second vent passage.

6. The electrical enclosure of claim 1, wherein one of the at least two interlocking compartment modules comprises a circuit breaker compartment module housing a circuit breaker, wherein the circuit breaker housed in the circuit breaker compartment module is electrically connected to the busbar assembly.

7. The electrical enclosure of claim 6, wherein each of the interlocking compartment modules comprises the circuit breaker compartment module or an auxiliary compartment module, wherein:

each auxiliary compartment module comprises an interior wall extending from the base, the interior wall spaced from the terminal wall to define an exhaust passage therebetween;

each circuit breaker compartment module comprises an interior housing that encloses the circuit breaker housed in the circuit breaker compartment module, the interior housing comprising a back plate spaced from the terminal wall to define an exhaust passage therebetween;

the exhaust passages of the interlocking compartment modules align to form an exhaust channel extending through the modular cabinet; and a main interior of each circuit breaker compartment module is fluidly connected to the exhaust channel.

8. The electrical enclosure of claim 1, wherein the at least two interlocking compartment modules comprised of a plurality of vertically aligned interlocking compartment modules.

9. A method of assembling an electrical enclosure, the method comprising:

providing a main cabinet, the main cabinet having an end wall, a bus compartment, and a cable compartment located between the end wall and the bus compartment, the bus compartment comprising a busbar assembly;

forming a modular cabinet by interlocking a first compartment module with a second compartment module, at least one of the first compartment module or the second compartment module housing a circuit breaker, each of the first compartment module and the second compartment module comprising first and second side panels, each of the first and second side panels having at least one alignment member, wherein interlocking the first compartment module with the second compartment module includes engaging the at least one alignment member of each of the first and second side panels of the first compartment module with the at least one alignment member of a respective one of the first side panel or the second side panel of the second compartment module, wherein the interlocking the first compartment module with the second compartment module further includes engaging a terminal wall of the first compartment module with a terminal wall of the second compartment module to form a structural wall of the modular cabinet;

electrically connecting the circuit breaker housed in the at least one of the first compartment module or the second compartment module to the busbar assembly; and removably securing the main cabinet to the modular cabinet.

10. The method of claim 9, wherein the interlocking the first compartment module with the second compartment module further includes aligning an exhaust passage defined within the first compartment module with an exhaust passage defined within the second compartment module to form an exhaust channel extending through the modular cabinet.

* * * * *